United States Patent
Obermiller et al.

(10) Patent No.: US 9,697,104 B2
(45) Date of Patent: Jul. 4, 2017

(54) END-TO END TRACING AND LOGGING

(71) Applicant: SAP SE, Walldorf (DE)

(72) Inventors: Nils Obermiller, Heidelberg (DE); Frank Brunswig, Heidelberg (DE); Matthias Geiger, Schwetzingen (DE); Martin Moser, Speyer (DE); Claudia Schmidt, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/961,827

(22) Filed: Dec. 7, 2015

(65) Prior Publication Data

US 2017/0161167 A1 Jun. 8, 2017

(51) Int. Cl.
*G06F 9/44* (2006.01)
*G06F 11/36* (2006.01)
*G06F 17/30* (2006.01)

(52) U.S. Cl.
CPC ........ *G06F 11/364* (2013.01); *G06F 11/3664* (2013.01); *G06F 17/30174* (2013.01)

(58) Field of Classification Search
CPC .......................... G06F 11/364; G06F 17/30174
See application file for complete search history.

(56) References Cited

U.S. PATENT DOCUMENTS

| | | | | |
|---|---|---|---|---|
| 6,282,701 B1* | 8/2001 | Wygodny | ........... | G06F 11/3466 702/183 |
| 6,539,501 B1* | 3/2003 | Edwards | ............. | G06F 11/3466 714/38.13 |
| 6,539,542 B1* | 3/2003 | Cousins | .................. | G06F 8/457 717/143 |
| 7,200,588 B1* | 4/2007 | Srivastava | .......... | G06F 11/3636 |
| 2005/0097149 A1* | 5/2005 | Vaitzblit | ............. | G06F 21/6227 |
| 2006/0242627 A1* | 10/2006 | Wygodny | ........... | G06F 11/3636 717/128 |
| 2010/0088683 A1* | 4/2010 | Golender | .............. | G06F 9/4446 717/128 |
| 2010/0100774 A1* | 4/2010 | Ding | .................... | G06F 11/3636 714/45 |
| 2011/0022707 A1* | 1/2011 | Bansal | ..................... | H04L 67/22 709/224 |
| 2012/0124428 A1* | 5/2012 | Zeng | ................... | G06F 11/3476 714/45 |
| 2012/0303396 A1* | 11/2012 | Winkler | ................. | G06Q 10/00 705/7.11 |
| 2015/0033205 A1* | 1/2015 | Wintergerst | .......... | G06F 11/362 717/124 |

\* cited by examiner

*Primary Examiner* — Chameli Das

(57) ABSTRACT

A unique identifier is provided for a transaction. The unique identifier provided by a passport library. Corresponding trace and log data is assigned to the unique identifier of the transaction. A UI trace file is generated, the UI trace file comprising the unique identifier and UI trace and log data comprised in the assigned trace and log data. The UI trace file is replicated in a centralized system database and the UI trace file is parsed to extract the unique identifier and the UI trace and log data. Detailed trace and log data is dynamically collected from systems connected to the centralized system based on the unique identifier of the transaction. Detailed trace and log data and the UI trace and log data is aggregated in an end-to-end analysis tool.

16 Claims, 6 Drawing Sheets

US 9,697,104 B2

END-TO END TRACING AND LOGGING

FIELD

Embodiments described herein generally relate to detecting and/or correcting errors in electrical computers and digital data processing systems, as well as registering or recording detected error or fault to present history for diagnostic purposes.

BACKGROUND

Logging is commonly used for monitoring, analyzing, or performing diagnostic activities over a computer system. Data logging includes creation of log files to record events that occur in various software runs. Logging includes creating and storing a permanent record of events that can be reviewed, printed, and analyzed. The events include occurred errors, exceptions (critical to system, application, and user), and unexpected returns. Even an event that is not an error by itself but might lead to errors is log relevant. Each log record usually contains information for the source of the record, events, and timestamp of the event, a message and a severity that specifies the importance of the record. This information is needed for administrators to control the status of the system, the database, and applications. Typically, logging is enabled.

However, besides error and event reporting, an application/program flow must be examined and understood to diagnose an abnormal condition. Tracing provides a facility for following a program flow and locating performance bottlenecks and/or discovering a path leading to an error. The trace facility produces a detailed sequence of statements that describe the events of an operation as they are executed. Since tracing may generate huge amounts of data in a short time, it is typically not enabled. Tracing can be switched on when a problem occurs and a detailed analysis of a distinct part of a program is necessary. Having good quality logs and traces as a starting point to analyze and resolve problems and errors is essential. In network environment, where multiple systems are connected and operate as one, it is even more important to have quality logs and traces. Not per involved system, but end-to-end.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for end-to-end tracing and logging are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
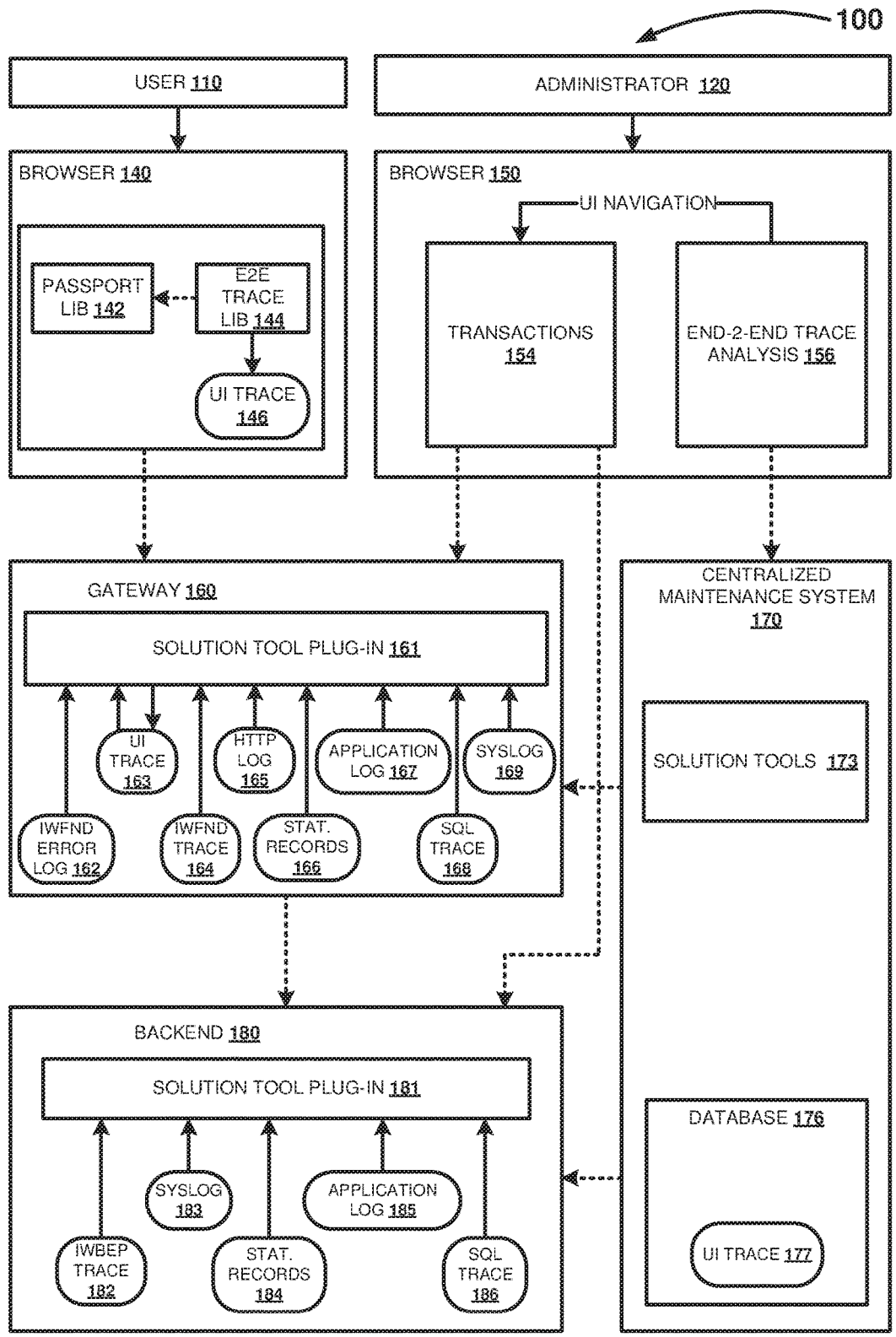
FIG. 1 is a block diagram illustrating an end-to-end tracing and logging infrastructure, according to one embodiment.

FIG. 1 is a block diagram illustrating system infrastructure 100 that provides end-to-end (E2E) tracing and logging data. E2E tracing and logging data is provided in a centralized analysis tool such as end-2-end (E2E) trace analysis 156, according to one embodiment. E2E tracing and logging affects all units and components of system 100, from frontend to backend. The frontend and the backend represent different layers in computer system 100. The frontend is a presentation layer, an interface between user 110 and the backend system. For example, browser 140 provides a user interface (UI) to user 110. Typically, a user contacts a system through a client. For example, user 110 accesses the system through browser 140. In various embodiments, user 110 may access the system through different types of clients. The clients include, but are not limited to, Web browsers, voice browsers, application clients, and other components that may access, consume, and display content. The backend represents a data access layer. The backend provides resources that are accessed through the frontend. For example, the backend may reference an object and object attributes from a database. The frontend and the backend may be distributed across more than one system.

Log data at the frontend may be managed via logging application program interfaces (APIs) that provide data managing methods. In one embodiment, the logging APIs may be provided by a UI framework such as OpenUI5 framework that is maintained by the SAP® UI5 framework, or other. Logging methods include, but are not limited to, jQuery.sap.log.#debug, jQuery.sap.log.#info, jQuery.sap.log.#warning, jQuery.sap.log.#error and jQuery.sap.log.#fatal. Each of the logging methods creates and records a log entry that contains at least: a timestamp, a level of details to be logged, a message with details of the different events during the execution, and component level information of the processes executed at each component. Log entries are created by logging methods at the frontend. A client such as browser 140 provides the frontend, according to one embodiment. Collection of log data at browser 140 is enabled. Detail level of log data may be adjusted, according to one embodiment. For example, in case of debugging or error resolving when more detailed insight of log data is necessary.

In addition to the log data, browser 140 includes end-to-end (E2E) trace library 144. E2E trace library 144 is configured to collect UI trace 146 at the frontend, according to one embodiment. Collection of UI trace 146 is triggered upon receiving a request for UI trace data. A request for UI trace data may be sent by an administrator, for example, through E2E trace analysis 156. UI trace 146 includes a network trace that provides details on path and transit delays of packets across the network. Further, the UI trace 146 may include information for invoked libraries, name of an application executing at the web browser, plug-ins, and operating system administration data. E2E trace library 144 classifies the collected data per transaction in UI trace 146. In addition, frontend sub-records (FESRs) data for the frontend is also recorded. FESRs provide trace data for transactions, performance, and client at the frontend (e.g., the client side). Transactions data collected at the frontend includes root context ID and transaction ID for each dialog step of a transaction. Performance data at the frontend includes at least end-to-end time, request time, and amount of transferred data. Client information including client type, browser type and client operating system (OS), is also collected. FESRs trace data is transferred to gateway 160. For example, the FESRs trace data is transported in a hypertext transfer protocol (HTTP) header. In one embodiment, a mandatory header may be sent for each dialog step of a transaction and an optional header may be sent with additional performance data. At gateway 160, the FESRs trace data is retrieved from the HTTP header and stored in statistical records 166, according to one embodiment. FESRs trace data statistical records may be viewed and analyzed at gateway 160 via a dedicated analysis application (e.g., STAD in an SAP NetWeaver® system).

Each action performed by user 110 is represented by a corresponding transaction. A transaction consists of a sequence of dialog steps. A dialog step consists of a user interaction that triggers an action of a server. Performance data for each dialog step is collected and stored in statistical records 166. In various embodiments, a dialog step is the processing needed to get from one UI screen view to another. A dialog step may include processing steps for displaying data on the other UI screen view based on the request received from a user. A dialog step may involve one or more request-response cycles (e.g., HTTP round-trips). One skilled in the art will recognize, however, that a dialog step may involve zero request-response cycles. Typically, a transaction includes several dialog steps. User 110 accesses backend 180 via browser 140, according to one embodiment. Actions of user 110 trigger changes across the frontend, the backend, and systems that interconnect the frontend and the backend. A transaction that corresponds to a current action includes data for changes across the frontend, the backend and the interconnecting systems. The changes are triggered by the current action.

In one embodiment, E2E trace library 144 is configured to assign a unique identifier (passport) to each transaction. The unique identifier is a data container that is capable to tag requests entering, running through, and/or leaving a processing unit from system infrastructure 100. The unique identifier includes at least data for trace instructions, creator information, and identification tags. The identification tags enable tracking of requests along processing units of system 100. The unique identifier, assigned by the E2E trace library 144 to a transaction, is provided by passport library 142, according to one embodiment.

The units of system 100 provide a logical connection between the UI and backend 180. Traces and logs are recorded in each unit of system 100. Depending on the transaction that trigger changes, recorded traces and logs alongside units of system 100 are associated with the unique identifier of the respective transaction.

Trace and log data collected at the frontend may be inspected via a browser development tool, according to one embodiment. For example, the trace and log data may be inspected via Google Chrome™ browser debugger or SAP® Web Integrated Development Environment (SAP WebIDE).

Browser 140 is connected to gateway 160. Gateway 160 provides a connection between the frontend and one or more backend systems, according to one embodiment. Gateway 160 exposes data from one or more backend systems to the frontend. Although gateway 160 is a separate unit that runs on a dedicated gateway server, as FIG. 1 illustrates, one skilled in the art will recognize that gateway 160 may be realized as a software component rather than a hardware component and may run on a shared computer hardware along with one or more units of system 100. For example, browser 140 and gateway 160 may run on the same server.

Gateway 160 records trace and log transaction data. In one embodiment, gateway 160 records data that includes, but is not limited to, IWFND error log 162, IWFND trace 164, HTTP log 165, statistical records 166, application log 167, SQL trace 168, and SYSLOG 169. The IWFND error log 162 provides detailed context data for errors that have occurred at runtime. IWFND trace 164 provides data for system performance. HTTP log 165 delivers data for incoming and outgoing HTTP requests. Statistical records 166 combines resource usage of individual dialog steps and transactions. Statistical records 166 contains statistic details for at least proportions of response time, database accesses, memory usage, and connection calls. Application log 167 contains application log entries created by the gateway processes. There is a specific UI viewer provided to analyze the application log entries. SQL trace 168 provides data for database performance.

In addition to the collected trace and log data, gateway 160 also stores UI trace 163. UI trace 163 represents a reference to UI trace 146 that is collected from the frontend. In one embodiment, upon collection in browser 140, UI trace 146 is transported to gateway 160 and then stored as UI trace 163.

Trace and log data of gateway 160 is collected by solution tool plug-in 161, according to one embodiment. Solution tool plug-in 161 also establishes a connection with a centralized system where the collected trace and log data may be replicated and presented in one or more aggregation modules. In one embodiment, solution tool plug-in 161 is plug-in module of solution tools 173 of centralized maintenance system 170. Solution tool plug-in 161 is installed on gateway 160 server to perform trace and log data collection and to establish a connection between gateway 160 and solution tools 173 of centralized maintenance system 170.

Similarly, a plug-in module of solution tools 173 may be installed on each unit that is connected to the centralized maintenance system 170 and is part of system 100, according to one embodiment. For example, solution tool plug-in 181 is installed on backend 180 server to establish a connection with solution tools 173 of centralized maintenance system 170 and to collect trace and log data from backend 180.

Solution tool plug-in 181 collects trace and log data for backend 180 that includes IWBEP trace 182, SYSLOG 183, statistical records 184, application log 185, and SQL trace 186, according to one embodiment. IWBEP trace 182 provides data for system performance. Statistical records 184 combines resource usage of individual transactions. Statistical records 184 contains statistical details for at least proportions of response time, database accesses, memory use, connection calls. Application log 185 provides a specific viewer for application log entries created by gateway processes. SQL trace 186 provides data for database performance.

Backend 180 includes one or more backend applications. In one embodiment, backend 180 represents a single backend application that is connected to gateway 160. However, backend 180 may include more than one backend applications. Backend 180 may be a bundle of business applications that provide integration of information and processes, collaboration, specific functionality, and scalability. For example, backend 180 may consist of various business applications including, but not limited to, Enterprise Resource Planning (ERP) applications, Customer Relationship Management (CRM) applications, Supplier Relationship Management (SRM) applications, Supply Chain Management (SCM) applications, and Product Lifecycle Management (PLM) applications. Similarly, each of the backend systems included in backend 180 may have a separate plug-in module of solution tools 173 installed thereon. Each plug-in module is responsible for collection of trace and log data of respective backend system and for establishing a connection between the respective backend system and the centralized maintenance system 170.

Centralized maintenance system 170 is connected to gateway 160 and to backend 180. Centralized maintenance system 170 includes database 176 that stores UI trace 177. UI trace 177 represents a reference to UI trace 163. UI trace 163 is originally stored in gateway 160 and then replicated in database 176 via the connection established by solution tool plug-in 161 between gateway 160 and centralized maintenance system 170, according to one embodiment. UI trace 177 needs to be stored in an appropriate format suitable for storing data and for electronic share of structured data. For example, UI trace 177 may be stored in the format of an Extensive Markup Language (XML) file.

Centralized maintenance system 170 is a centralized tool for maintenance and management of connected systems, including gateway 160 and applications from backend 180. Centralized maintenance system 170 provides administrators such as administrator 120 with capabilities to support, enhance, automate, and improve management of connected systems, according to one embodiment. Centralized maintenance system 170 provides features for application lifecycle management that include but are not limited to, test management, upgrade management, solution documentation, and solution implementation. A feature is accessed through a dedicated sub-application that is part of centralized maintenance system 170.

In one embodiment, administrator 120 accesses dedicated sub-applications via browser 150. By launching a dedicated sub-application, administrator 120 has access to the corresponding UI of the launched application. For example, by launching E2E trace analysis 156, administrator 120 accesses aggregated trace and log data regarding systems that are connected to the centralized maintenance system 170. As part of centralized maintenance system 170, E2E trace analysis 156 accesses database 176 to parse UI trace 177 and to extract unique identifiers of transactions. Administrator 120 can then navigate to transactions 154 to get more details for logs and traces per a specific transaction, according to one embodiment. The E2E trace analysis 156 can dynamically collect data for a transaction from known systems (e.g., systems that are connected to centralized maintenance system 170) based on the unique identifier of the transaction that the E2E trace analysis 156 reads from UI trace 177.

The E2E trace analysis 156 provides an overview on the execution time periods of single calls from the frontend system to involved backend system in system 100 landscape, according to one embodiment. Upon launching E2E trace analysis 156, administrator 120 can navigate from E2E trace analysis 156 UI to transactions 154 UI. In one embodiment, administrator 120 is able to review logs and traces that are associated with a corresponding transaction across system 100 landscape by selecting the transaction from transactions 154. For example, administrator 120 can select transactions "/IWFND/APPS_LOG" and "/IWBEP/VIEW_LOG" within the UI of transactions 154 to inspect application log 167 of gateway 160 and application log 185 of backend 180, respectively. Based on the unique identifier associated with each transaction, the E2E trace analysis 156 dynamically collects trace and log data from all units of system 100 and provides the collected trace and log data to administrator 120.

The E2E trace analysis 156 offers also navigation capabilities to the individual logging/tracing tools of each of the connected systems. In one embodiment, the E2E trace analysis 156 provides a Unified Resource Locator (URL) framework that determines the URL of a specific local trace UI. In one embodiment, administrator 120 can navigate from E2E trace analysis 156, through transactions 154, to a specific trace or log record of a connected system. For example, administrator 120 may navigate to SQL trace 168 of gateway 160. In such case, the E2E trace analysis 156 invokes the URL framework that automatically determines the URL of the SQL trace 168. The URL is determined based on the unique identifier. That information is included in UI trace 177, stored in database 176 of centralized maintenance system 170.

In various embodiments, the communication between the frontend, gateway 160 and the backend 180 is realized according to a secure network protocol. For example, system components may communicate over Hypertext Transfer Protocol Secure (HTTPS). Further, systems may establish a connection via specialized remote interfaces that allow for calling a function to be executed in a remote system and to provide a way for an external program (written in programming languages such as PHP, ASP, Java® programming language, or C, C++) to use data returned from a server that executes programs written in other programming languages. For example, a connection may be established between an external program and an Advanced Business Application Programming (ABAP®) server over Remote Function Call (RFC) interface owned by SAP® SE Company.

Figure 2:
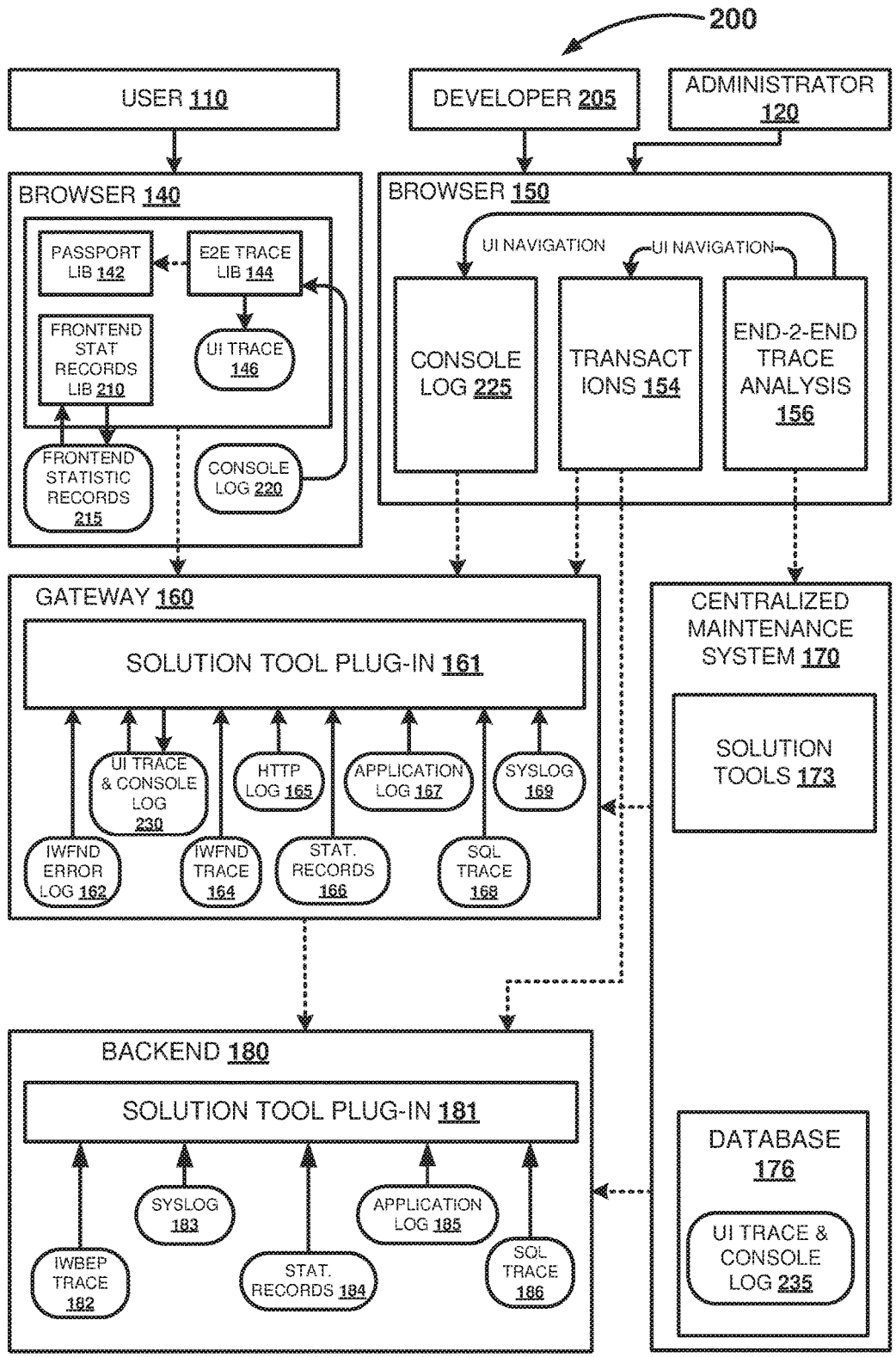
FIG. 2 is a block diagram illustrating an end-to-end tracing and logging infrastructure including console log and frontend statistic records, according to one embodiment.

FIG. 2 is a block diagram illustrating system infrastructure 200 that provides end-to-end tracing and logging data, console log data and frontend statistic records in a centralized analysis tool, according to one embodiment. In one embodiment, the centralized analysis tool is an end-2-end (E2E) trace analysis 156. System 200 may include several elements similar to elements of system 100. Further, system 200 may include several elements in addition to elements of system 100, for example, system 200 may include a frontend statistic records library 210. With reference to FESR data for the frontend presented in FIG. 1, frontend statistic records library 210 stores FESR data with dialog step granularity. FESR data is collected via a specific API included in frontend statistic records 215. Further, frontend statistic records 215 may be integrated with various native libraries of mobile development platforms thus enabling recording of frontend statistics data from mobile UIs. For example, native libraries of mobile development platforms such as Apple® iOS, Android™, BlackBerry® and Windows® may be integrated with frontend statistic records 215. FESR data measures client performance data on a dialog step level, according to one embodiment.

In addition to trace and log data, gateway 160 also stores UI trace & console log 230. UI trace & console log 230 represents a combination of UI trace 146 and console log 220 that are recorded and collected at frontend. In one embodiment, UI trace 146 and console log 220 is collected at browser 140, transported to gateway 160, and stored as UI trace & console log 230.

Centralized maintenance system 170 is connected to gateway 160 and to backend 180. Centralized maintenance system 170 includes database 176 that stores UI trace & console log 235. Similar to UI trace 177 described with reference to FIG. 1, UI trace & console log 235 represents a reference to UI trace & console log 230 that is initially stored in gateway 160 and then replicated in database 176 via the connection established by solution tool plug-in 161 between gateway 160 and centralized maintenance system 170. UI trace & console log 235 needs to be stored in an appropriate format suitable for storing data and for electronic share of structured data. For example, UI trace & console log 235 may be stored in the format of an Extensive Markup Language (XML) file.

Further to the functionalities described with reference to FIG. 1, E2E trace analysis 156 provides a function to navigate to console log 225. Console log 225 provides administrator 120 console log data for the frontend of the system. Specifically, console log 225 gives administrator 120 access to data of console log 220 that is collected in browser 140.

In one embodiment, E2E trace analysis 156 is further configured to provide described navigation capabilities not only to administrator 120 but to other users. For example, E2E trace analysis 156 may provide navigation capabilities to logs and traces of the system to developers, such as developer 205. In combination with dialog step granularity of FESR data in frontend statistic records 215, a functionality to observe a live trace preview of processes running in the system may be provided. Live trace preview provides details for an application execution/processing flow, based on a business logic, through all units of system during development, according to one embodiment. Live trace preview may be enabled during application design time to deliver detailed trace data for the impact that a newly written application source code has over each of the connected systems.

Although E2E trace analysis may be launched through a UI of sub-applications provided by a centralized maintenance system, various embodiments may include the E2E trace analysis being launched through a number of different interfaces. For example, an integration may be provided with a development environment enabling live trace previews and examination of logs to be performed by a developer during the process of creating source code of an application.

Figure 3:
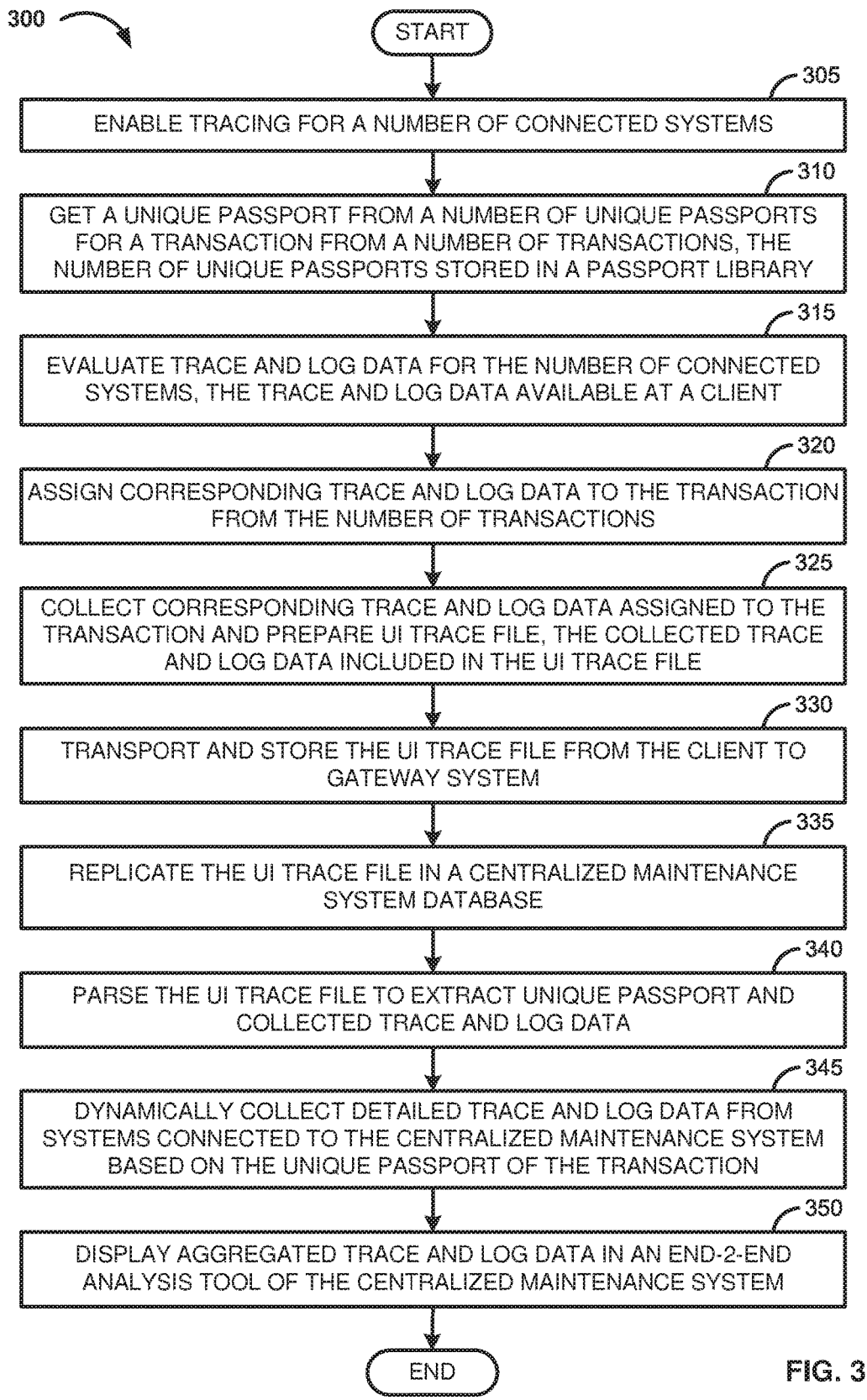
FIG. 3 is a flow diagram illustrating a process to collect and provide end-to-end traces and logs, according to one embodiment.

FIG. 3 illustrates process 300 that collects data for end-to-end (E2E) traces and logs and provides the collected data to a centralized maintenance system in an appropriate format, according to one embodiment. The process of collecting E2E traces and logs starts with enabling tracing functionality, at 305, for a number of known systems (systems that are connected to the centralized maintenance system). Enabling traces includes switching traces "on" and starting a trace process, according to one embodiment. For example, traces may be enabled via a diagnostics tool. In one embodiment, an administrator selects a trace enablement functionality. Upon enablement of the trace functionality, a user can start E2E tracing. In one embodiment, the user has additional configuration options, for example to set a level of details of traces to be collected throughout the system.

When tracing is enabled, at 310, a unique passport (identifier) from a number of unique passports is assigned to a transaction from a number of transactions performed within the system that is subject of E2E tracing. The number of unique passports (identifiers) is stored in a passport library, according to one embodiment. Then, at 315, trace and log data for the number of known systems is evaluated. In one embodiment, the passport library is part of the frontend system that provides access to backend resources through a client, such as a web browser.

At 320, evaluated trace and log data is assigned to a corresponding transaction from the number of transactions and, respectively, to the unique passport of the relevant transaction. Then, at 325, the assigned data is collected and included in a trace file. The trace file needs to be stored in an appropriate format for storing data and for electronic sharing of structured data. In one embodiment, steps 310-325 may be performed by an E2E trace library that is part of the frontend.

At 330, the trace file is transported and stored from the frontend to a gateway system. Upon storing, at 335, the trace file is replicated in a centralized maintenance system database. At 340, the trace file is parsed to extract unique passport (identifier), and trace and log data. The trace file is parsed by an E2E trace analysis tool provided by the centralized maintenance system, according to one embodiment. Upon extraction of the unique passport and trace and log data from the UI trace file, at 345, the E2E trace analysis tool dynamically collects detailed trace and log data from known systems, for example gateway system and backend system, based on the unique passport.

At 350, the E2E analysis tool of the centralized maintenance system displays aggregated trace and log data. In one embodiment, the E2E trace analysis tool provides navigation capability to a dedicated transactions UI. The aggregated trace and log data is classified per each transaction and displayed on the dedicated transactions UI.

Figure 4:
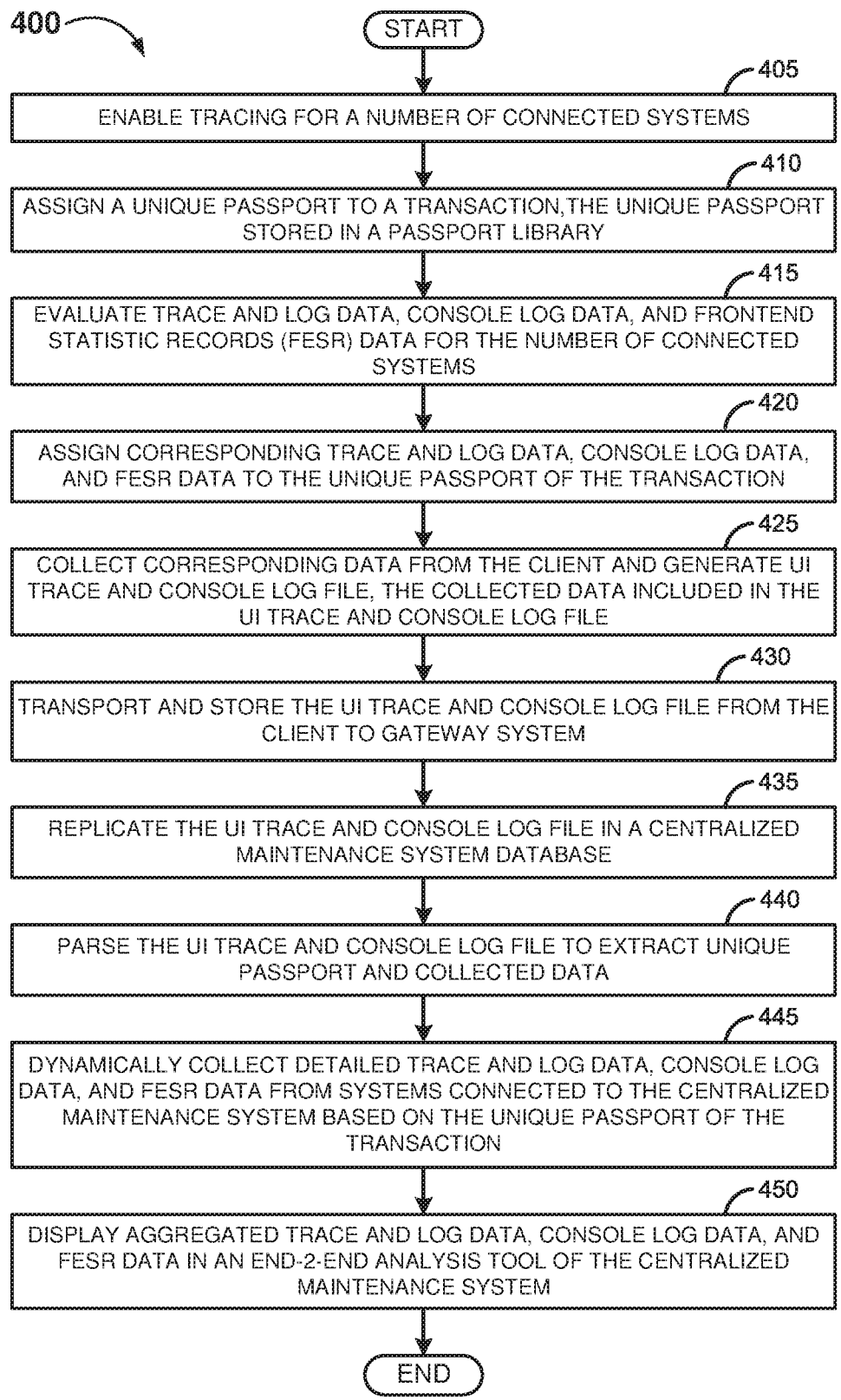
FIG. 4 is a flow diagram illustrating a process to collect and provide end-to-end traces and logs including console log and frontend statistic records, according to one embodiment.

FIG. 4 illustrates process 400 that collects and provides data for E2E traces and logs including console log and frontend statistic records, according to one embodiment. Process 400 is similar to process 300 described with reference to FIG. 3. Further to providing E2E data for traces and logs, process 400 describes provision of console log data and frontend statistic records data.

At 405, tracing is enabled for systems connected to a centralized maintenance system. At 410, a unique passport (identifier) is assigned for each transaction. The unique passport is provided by a passport library, according to one embodiment. At 415, console log data and frontend statistic records (FESR) data is evaluated, along with trace and log data. Similar to trace and log data, console log and FESR data are collected from the frontend (e.g. the client). FESR data is collected with dialog step granularity.

At 420, evaluated trace and log data, console log data, and FESR data is assigned to a corresponding transaction from the number of transactions and, respectively, to the unique passport of the corresponding transaction. Then, at 425, the assigned corresponding data is collected and included in a UI trace & console log file. Console log trace data is collected at the frontend (at the client side) and included in the UI trace & console log file by an E2E trace library, according to one embodiment. The UI trace & console log file needs to be stored in an appropriate format for storing data and for sharing the structured data. For example, in the format of Extensive Markup Language (XML) file. In one embodiment, steps 410-425 may be performed by the E2E trace library that is part of the frontend.

At 430, the UI trace & console log file is transported and stored from the frontend to a gateway system. Upon storing, at 435, the UI trace & console log file is replicated in a centralized maintenance system database. At 440, the UI trace & console log file is parsed to extract unique passport, and trace and log data. The UI trace & console log file is parsed by an E2E trace analysis tool provided by the centralized maintenance system, according to one embodiment. Upon extraction of the unique passport and trace and log data from the UI trace & console log file, at 445, the E2E trace analysis tool dynamically collects detailed trace and log data from known system based on the unique passport.

At 450, the E2E analysis tool of the centralized maintenance system displays aggregated trace and log data. In one embodiment, the E2E trace analysis tool provides navigation capability to a dedicated transactions UI where the aggregated trace and log data is classified per transaction and displayed. Similarly, a navigation capability to a dedicated UI is provided for accessing the console log data collected at the frontend.

Figure 5:
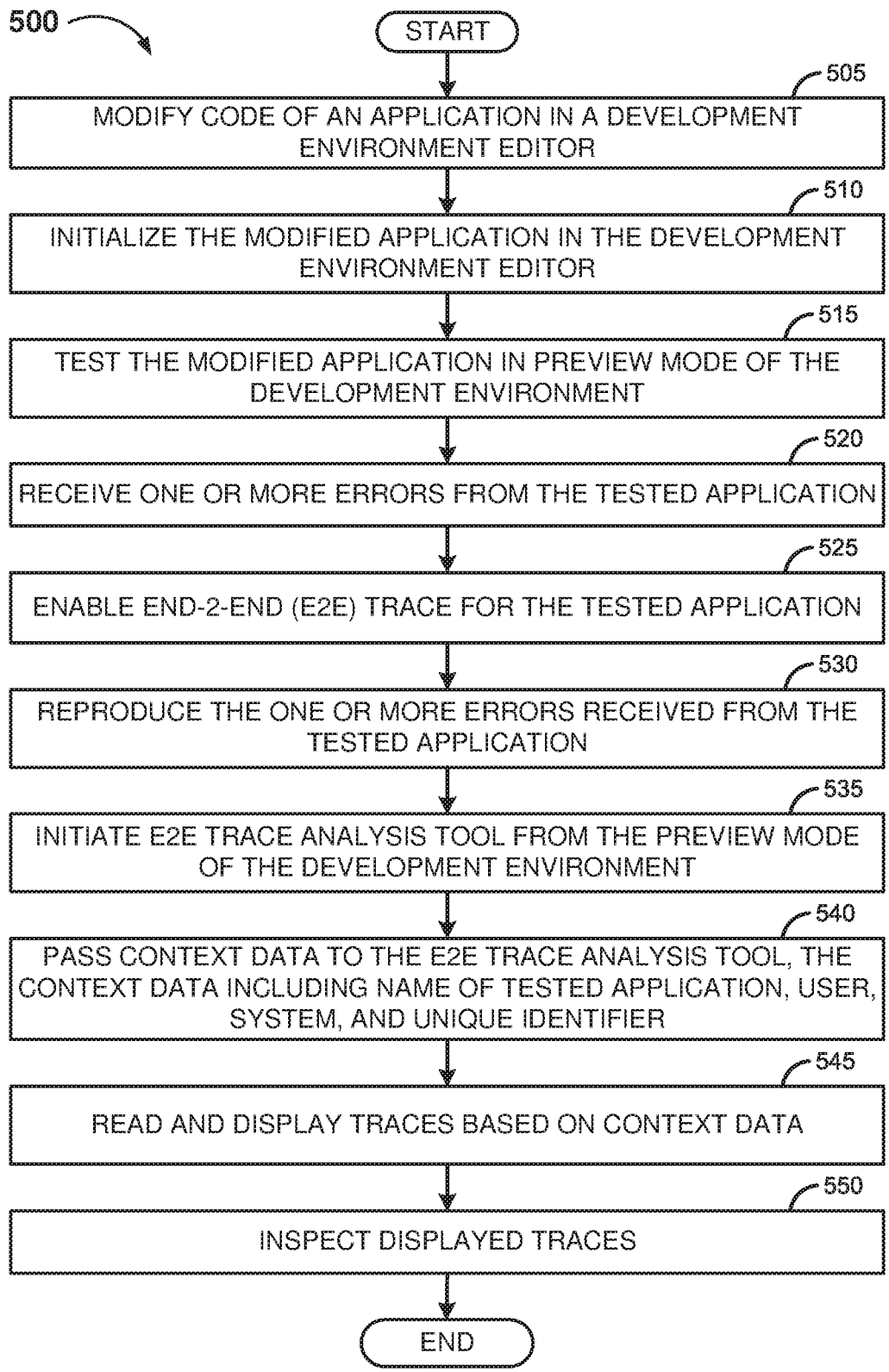
FIG. 5 is a flow diagram illustrating a process to deliver live traces within a development environment, according to one embodiment.

FIG. 5 illustrates process 500 that delivers trace data during design time within a development environment, according to one embodiment. An integration of E2E trace analysis tool may be provided with a development environment thus enabling traces previews and examination of logs to be performed by a developer in parallel with the process of creating source code of an application. At 505, the application code is modified. In one embodiment, the application code is modified in an editor mode of a development environment. The development environment may be a web development environment or an integrated development environment (IDE). The development environment may include a set of embedded tools covering the end-to-end development process including trace and log analysis. The development environment may contain an extensible plug-in system for customizing each development environment instance. Further, the development environment may be a combination of a web development environment and an IDE, according to some embodiments.

At 510, the modified application is initialized in the editor mode of the development environment. Then, at 515, the application is tested in a preview mode of the development environment. Upon testing, at 520, one or more errors are detected.

Process 500 continues at 525, where end-to-end (E2E) trace is enabled for the tested application. The one or more detected errors are recreated by a developer at 530. Upon trace enablement, recreation of errors is performed to enable collection of trace data that includes details for the detected errors. Thus, a developer is able to inspect and correct detected errors that may be a reason for an abnormal condition. Next, at 535, the E2E trace analysis tool is initiated directly from the preview mode of the development environment. Upon initialization of the E2E trace analysis tool, at 540, context data is passed from the development environment to the E2E trace analysis tool. Context data includes at least a name of the tested application, a user of the application, a system name of the system hosting the application, and a unique identifier (passport). In one embodiment, live trace data for an application may be displayed on another user device. Live trace data means data for the flow of an application and processed business logic throughout all units of a system during design time. For example, if the user of the application is different from the support officer (e.g. administrator or a developer) performing the live trace, the administrator or the developer may remotely enable live trace at a user system. The E2E trace analysis tool then collects trace and log data across the user system based on the unique identifier. Data that is associated with the unique identifier is relevant for the application and, therefore, is collected by the E2E trace analysis tool.

At 545, relevant trace and log data is read and displayed for the developer. At 550, upon inspection of the live traces by the developer, process 500 that provides end-to-end live traces for inspection within a development environment, is discontinued.

Described is a system and method for providing end-to-end trace and log data including frontend in a centralized maintenance system. An end-to-end analysis tool of the centralized maintenance system dynamically collects and aggregates end-to-end trace and log data from systems connected to the centralized maintenance system based on a unique identifier. The unique identifier is assigned to a transaction by an end-to-end trace library at the frontend. The end-to-end trace and log data is provided to administrators of the system via UI navigation from the end-to-end analysis tool UI to a transaction UI. The end-to-end trace and log data is also provided to application developers. In one embodiment, the end-to-end trace and log data is provided to application developers within a development environment that is integrated with the end-to-end analysis tool. Further, a live trace is provided that delivers end-to-end trace and log data for a developed application in parallel with application design process.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media: and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java® programming language, C++, or other object-oriented programming language and development tools. Another embodiment may be implemented in hard-wired circuitry in place of, or in combination with machine readable software instructions.

Figure 6:
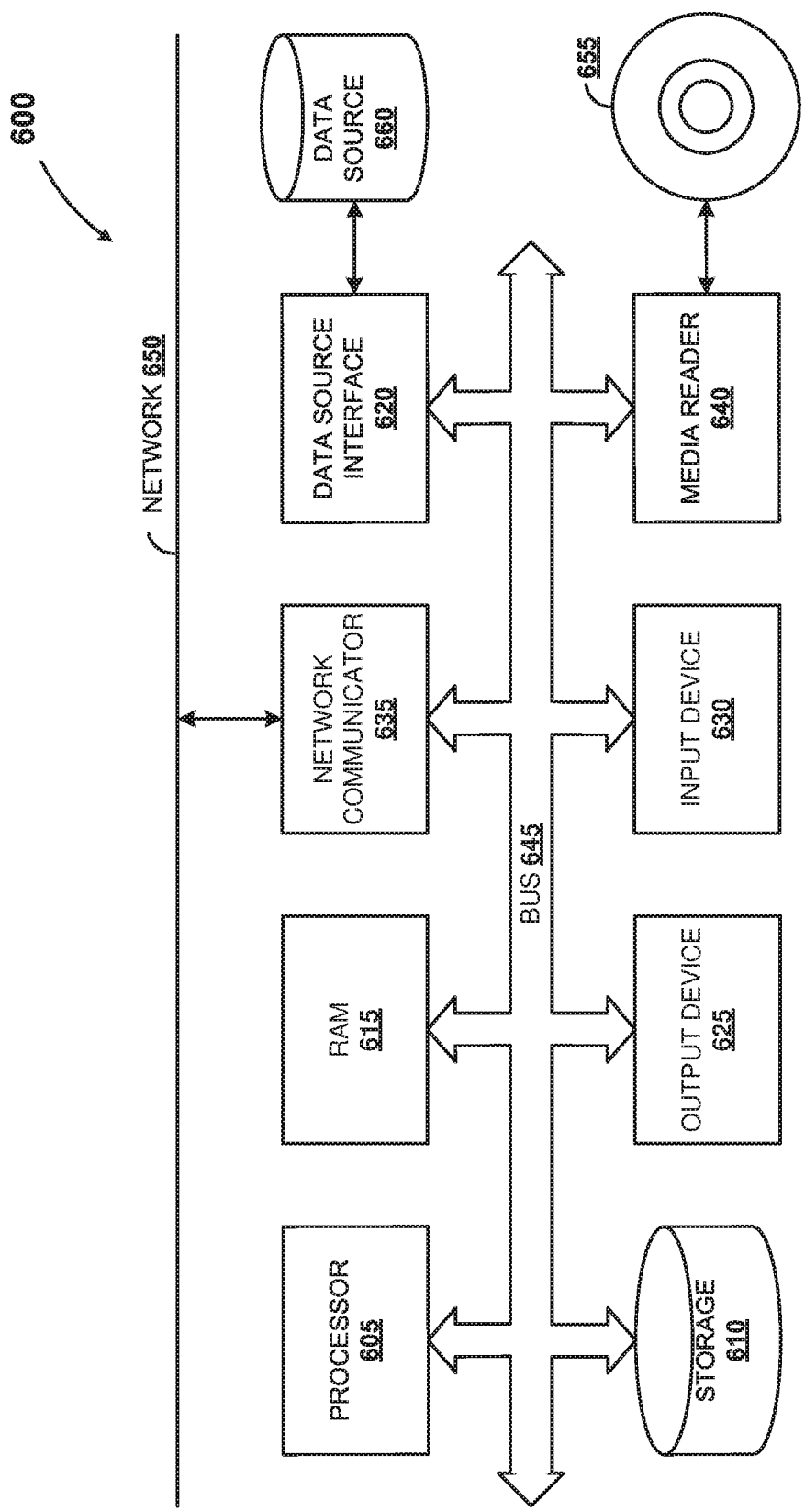
FIG. 6 is a block diagram of an exemplary computer system, according to one embodiment.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system. XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to provide end-to-end trace and log data, the method comprising:
    assigning a unique identifier to user interface (UI) trace and log data corresponding to a transaction triggered from a frontend;
    generating a UI trace file comprising the UI trace and log data and the unique identifier;
    transporting the UI trace file from the frontend to at least one system of a plurality of systems;
    replicating the UI trace file in a centralized system;
    parsing the replicated UI trace file to extract the unique identifier and the UI trace and log data assigned to the unique identifier, wherein the UI trace and log data is collected at the frontend, wherein the unique identifier and the UI trace and log data are associated with the transaction, and wherein the transaction runs through the plurality of systems;

dynamically collecting, based on the extracted unique identifier, trace and log data corresponding to the transaction from the plurality of systems, wherein the trace and log data from the plurality of systems is tagged with the unique identifier, and wherein the plurality of systems comprises at least one backend system; and aggregating the trace and log data collected from the plurality of systems and the UI trace and log data from the UI trace file.

2. The computer implemented method of claim 1, further comprising:

displaying in parallel trace and log data associated with an application within a development environment during development of the application, wherein the application is hosted by a system of the plurality of systems.

3. The computer implemented method of claim 1, further comprising:

evaluating the trace and log data for the plurality of systems.

4. The computer implemented method of claim 1 further comprising:

providing an option to navigate to the plurality of systems.

5. The computer implemented method of claim 4, wherein providing an option to navigate to the plurality of systems comprises providing a Uniform Resource Locator (URL) framework that automatically determines a URL of a system from the plurality of systems.

6. A computer system to provide end-to-end tracing and logging, the computer system comprising:

at least one processor and memory for executing program code, the program code comprising:

an end-to-end trace library that assigns a unique identifier to a transaction triggered from a frontend and collects user interface (UI) trace and log data corresponding to the transaction;

a client that generates a UI trace file comprising the UI trace and log data and the unique identifier, and transports the UI trace file to at least one connected system of a plurality of connected systems;

a solution tool plug-in module that connects to logs, traces, and statistics of the at least one connected system and replicates the UI trace file in a centralized system; and an end-to-end trace analysis tool that parses the UI trace file to extract the unique identifier and the UI trace and log data assigned to the unique identifier, dynamically collects, based on the unique identifier, trace and log data from the plurality of connected systems comprising at least one backend system, and aggregates the UI trace and log data from the UI trace file and the trace and log data from the plurality of connected systems, wherein the end-to-end trace analysis tool accesses the plurality of connected systems through the centralized system, wherein the trace and log data from the plurality of connected systems is tagged with the unique identifier, wherein the unique identifier and the trace and log data correspond to the transaction, and wherein the transaction runs through the plurality of connected systems.

7. The computer system of claim 6, wherein a passport library provides the unique identifier of the transaction.

8. The computer system of claim 6, wherein the end-to-end trace analysis tool provides UI navigation to the UI trace and log data collected at the frontend for the transaction and UI console log.

9. The computer system of claim 6, wherein the end-to-end trace analysis tool determines Unified Resource Locator (URL) of the at least one backend system via a URL framework, and provides UI navigation capability to the at least one backend system based on determined URL.

10. The computer system of claim 6, further comprising:

a development environment integrated with the centralized system, that provides navigation functionality to the end-to-end trace analysis tool.

11. The computer system of claim 10, wherein the development environment passes the unique identifier to the end-to-end trace analysis tool and displays trace and log data assigned to the unique identifier, wherein trace and log data associated with an application is aggregated by the end-to-end analysis tool in parallel during development of the application, and wherein the application is hosted by a connected system of the plurality of connected systems.

12. A non-transitory computer readable medium storing instructions, which when executed by at least one processor cause a computer to perform operations comprising:

access a user interface (UI) trace file stored in a centralized system, wherein the UI trace file is generated at a frontend, transported to a system of a plurality of systems, and replicated to the centralized system;

parse the replicated UI trace file to extract a unique identifier and UI trace and log data assigned to the unique identifier, wherein the UI trace and log data is collected at the frontend, wherein the unique identifier and the UI trace and log data correspond to a transaction, and wherein the transaction runs through a plurality of systems;

dynamically collect, based on the extracted unique identifier, trace and log data corresponding to the transaction from the plurality of systems, wherein the trace and log data from the plurality of systems is tagged with the unique identifier, and wherein the plurality of systems comprises at least one backend system; and aggregate the trace and log data collected from the plurality of systems and the UI trace and log data from the UI trace file.

13. The computer readable medium of claim 12, further comprising:

display in parallel the trace and log data associated with an application within a development environment during development of the application, wherein the application is hosted by a system of the plurality of systems.

14. The computer readable medium of claim 12, further comprising:

evaluate trace and log data for the plurality of systems.

15. The computer readable medium of claim 12, further comprising:

provide an option to navigate to the plurality of systems.

16. The computer readable medium of claim 15, wherein provide an option to navigate to the plurality of systems comprises provide a Uniform Resource Locator (URL) framework to automatically determine URL of a system from the plurality of systems.

* * * * *